United States Patent [19]
Brayton et al.

[11] Patent Number: 5,864,784
[45] Date of Patent: Jan. 26, 1999

[54] HAND HELD DATA COLLECTION AND MONITORING SYSTEM FOR NUCLEAR FACILITIES

[75] Inventors: Darryl D. Brayton, West Richland; Paul G. Scharold, Kennewick; Michael W. Thornton, Richland; Diana L. Marquez, West Richland, all of Wash.

[73] Assignee: Fluor Daniel Hanford, Inc., Richland, Wash.

[21] Appl. No.: 643,148

[22] Filed: Apr. 30, 1996

[51] Int. Cl.⁶ .............................. G06F 15/00; G06F 15/40
[52] U.S. Cl. .................... 702/187; 702/404; 364/705.01; 364/705.03; 342/357
[58] Field of Search ...................................... 364/550, 406, 364/401, 402, 468, 561, 449, 560, 705.01, 705.03; 342/357, 457; 340/988–996; 250/336.1, 432 R; 705/22, 404

[56] References Cited

U.S. PATENT DOCUMENTS

| | | | |
|---|---|---|---|
| 5,068,787 | 11/1991 | Pipella et al. | 364/406 |
| 5,185,857 | 2/1993 | Rozmanith et al. | 395/148 |
| 5,212,635 | 5/1993 | Ferriter | 363/402 |
| 5,233,533 | 8/1993 | Edstrom et al. | 364/468 |
| 5,267,147 | 11/1993 | Harshaw et al. | 364/401 |
| 5,488,558 | 1/1996 | Ohki et al. | 364/449 |
| 5,528,518 | 6/1996 | Bradshaw et al. | 364/561 |
| 5,591,974 | 1/1997 | Troyer et al. | 250/336.1 |
| 5,654,908 | 8/1997 | Yokoyama | 364/705.05 |

*Primary Examiner*—Kamini Shah
*Attorney, Agent, or Firm*—Veo Peoples, Jr.; J. William Stader; Holly M. Amjad

[57] ABSTRACT

Apparatus and method is disclosed for a data collection and monitoring system that utilizes a pen based hand held computer unit which has contained therein interaction software that allows the user to review maintenance procedures, collect data, compare data with historical trends and safety limits, and input new information at various collection sites. The system has a means to allow automatic transfer of the collected data to a main computer data base for further review, reporting, and distribution purposes and uploading updated collection and maintenance procedures. The hand held computer has a running to-do list so sample collection and other general tasks, such as housekeeping are automatically scheduled for timely completion. A done list helps users to keep track of all completed tasks. The built-in check list assures that work process will meet the applicable processes and procedures. Users can hand write comments or drawings with an electronic pen that allows the users to directly interface information on the screen.

7 Claims, 15 Drawing Sheets

Component History  10/8,94  4:08.00PM

Location: T188
Component: Liquid Level Tank Level

| Date | Value | Comments |
|------|-------|----------|
| 9/14/94 | 14.27 | |
| 9/15/94 | 12.55 | |
| 9/16/94 | 12.64 | |
| 9/17/94 | 14.58 | |
| 9/18/94 | 13.03 | |
| 9/19/94 | 13.41 | |
| 9/20/94 | 13.46 | |
| 9/21/94 | 13.08 | |
| 9/22/94 | 13.52 | |
| 9/23/94 | 13.85 | |

[Graph]  [Finished]

DATA RANGE

Date/Time  4:16:10 PM

Location  T  Component  Temperature Gage  Subcomponent  Thermocouple 07

Sub Location  109

Applicable Specification/Procedure

Safety Ranges

Minimum  Maximum  Units
 350.00  degrees F

Normal Operations Ranges

Minimum  Maximum

Data Quality Checks

Maximum Increase Since Last Reading  35.00
Maximum Decrease Since Last Reading  35.00

FINISHED

HAND HELD DATA COLLECTION AND MONITORING SYSTEM FOR NUCLEAR FACILITIES

The U.S. government has a paid-up license in this invention and the right in limited circumstances to require the patent owner to license others on reasonable terms as provided for by the terms of contract No. DE-AC06-87RL-10930 awarded by the United States Department of Energy.

BACKGROUND OF THE INVENTION

1. Field of Invention

This invention relates generally to computer means for collecting data, storing data, reviewing data, and organizing data for the purposes of scheduling, programming tasks, managing data, and program management of maintenance task by operators of the system. More particularly, this invention relates to a hand held computer that allows operators the ability to electronically gather data from locations, validate and verify the collected data, automatically recheck out-of-range data, call up procedural information, and to electronically transfer the collected data to a main computer system for administrative review.

2. Brief Description of the Prior Art

Typical methods of collecting data start with procedures and schedules which determine which data (e.g., surveillance and housekeeping) are needed to fulfill the business purposes. This data is collected on data collection forms which are typically on paper sheets. After field collection other personnel determines if the collected data is within limits and approve the sheets, then direct action based on the collected data as required, route the data to personnel and paper file systems for analysis and archiving on main computers periodically. Several problems exist with this method, including environmental limitations, (e.g., working conditions, clothing, equipment, weather, etc.), personnel limitations (personnel can not always easily bring in and carry out all related procedures and tasks information), no real time field data quality checks, errors and inefficiencies from reentry of data from paper sheets into computer data bases, and the time delay from the collection of the data to routing to analysts.

Other computers systems have been disclosed that basically provide a scheduled method and apparatus for maintaining equipment and manufacturing methods such as that described in U.S. Pat. No. 5,233,533 issued to Symmetrix, Inc. This system has scheduling software wherein resources are allocated to satisfy processes according to pre-established rules for allocation maintained in the software design.

Also see U.S. Pat. No. 5,185,857 issued to Hitachi, Ltd. wherein a method and apparatus for generating software specifications is described. In this method an information processing system for generating software specifications is provided that facilitates software maintenance work by generating a higher ranking specification for at least one software product attained by particularizing the high rank specification in the software development.

See also, U.S. Pat. No. 5,392,208 issued to Hitachi, Ltd. wherein a plant control system method for displaying the control thereof is provided. In this patent a method and apparatus for displaying on a display screen the controlling circuit in a plant control system for controlling a plant by a controller and a microcomputer. The display screen is segmented into software regions and hardware regions. The software which is realized by software displayed in the software region and the hardware circuit is displayed in the hardware region. Information which is plotted during the interactive process and is displayed in the software region automatically translated into a program for controlling the controller. Operation data of the plant is also given on the display screen. Desired circuit elements of the software circuit may be selected to change the parameters of the circuit's elements. Maintenance work can be carried while observing the indications on the display screen without any aid of documents such as a maintenance manual or the like.

All the systems described have one major drawbacks, the method of collecting data for introduction into the computer system is a manual collection means. It would be desirable if there were a hand held computer means that the operator could take out into the field to collect field data. These units would have software embedded that allows the operator to generate selected screens and windows so that the operator can electronically gather data, verify and validate the collected data, call procedural information, such as, actual text and graphics, and have interface that allows the information to be electronically transferred for administrative review later.

SUMMARY OF THE INVENTION

There is provided by this invention a data collection and monitoring system having a hand held computer unit which collects data, compares data with historical trends and safety limits, and guides the user through procedural steps. The unit has a means to allow automatic transfer of the collected data to a main computer data base for further review, reporting, and distribution purposes. The hand held computer has a running To Do list so sample collection and other general tasks, such as housekeeping are automatically scheduled for timely completion. A done list helps users to keep track of all completed tasks. The built-in check list assures that work process will meet the applicable processes and procedures. Users can hand write comments or drawings with an electronic pen that allows the users to directly interface information on the screen.

BRIEF DESCRIPTION OF THE PREFERRED EMBODIMENT

Figure 1:
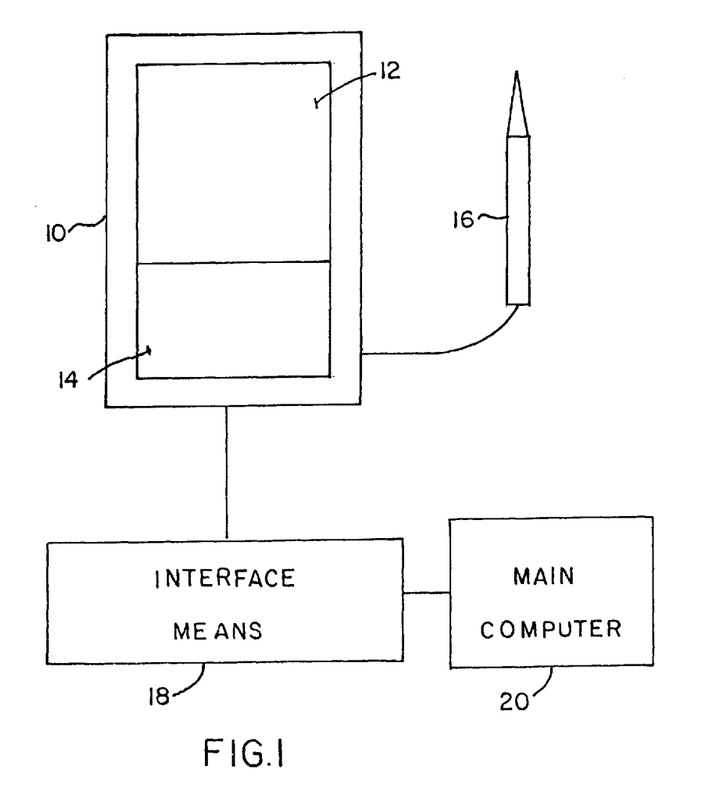
FIG. 1 is a basic block diagram of the computer system incorporating the principles of this invention.

Referring to FIG. 1, there is shown a block diagram of a data collection system incorporating the principles of this invention. The system consists of a hand held pen based computer 10 comprised of a display screen 12 and keyboard 14 having connected thereto an electronic pen 16 to input and display field data. This unit runs windows and therefore also multiple concurrent to be applications present (e.g. e-mail). Also the pen 16 is used as a selection device, pointer, and a drawing instrument. This pen based computer also has expandability for smart cards (PCMIA TYPE II), global positioning systems (GPS), and radio modems. Typically, such computers are controllers such as model K2000 from Kalidor the manufacturer. An interface device 18 such as a Kalidor cradle and/or a serial/parallel cable (not shown) provides for data transfer to a main computer system or personal computer 20. The cradle may provide for both data transfer and power charging. The main computer system 20 is programmed to perform scheduling, configuration maintenance, reviewing, routing and reporting. The configuration data for the main computer system is input into configuration data tables. These tables hold all necessary information to allow all business, security, and other processes necessary for data processing. Specifically, the system is configured for a facility's location, and logical data collection-related information (data components, quality check ranges, recheck actions, units, procedures, comments table, etc). The hand held computer 10 has a computer aided design styler program that gives the designer the ability to create color graphic displays or screens, or to make such displays dynamic by associated areas or objects on the displays to variables and/or registered values in the system value configuration. The display software allows the operator to monitor the overall system operation, provide detail control function and control information together with prompt and help messages and also indicates the location and origin of faults and malfunctions in the system. These active screens provides means to sense variations in process conditions, static or active as the case may be.

This system and apparatus is particularly applicable to the process of monitoring time sensitive environmental parameters at collection sites, such as monitoring radiation levels in nuclear facility. Such a process is described in the co-pending U.S. patent application Ser. No. 07/954,511 filed Sep. 30, 1992 assigned to the assignee of the instant application and incorporated herein by reference.

Figure 2:
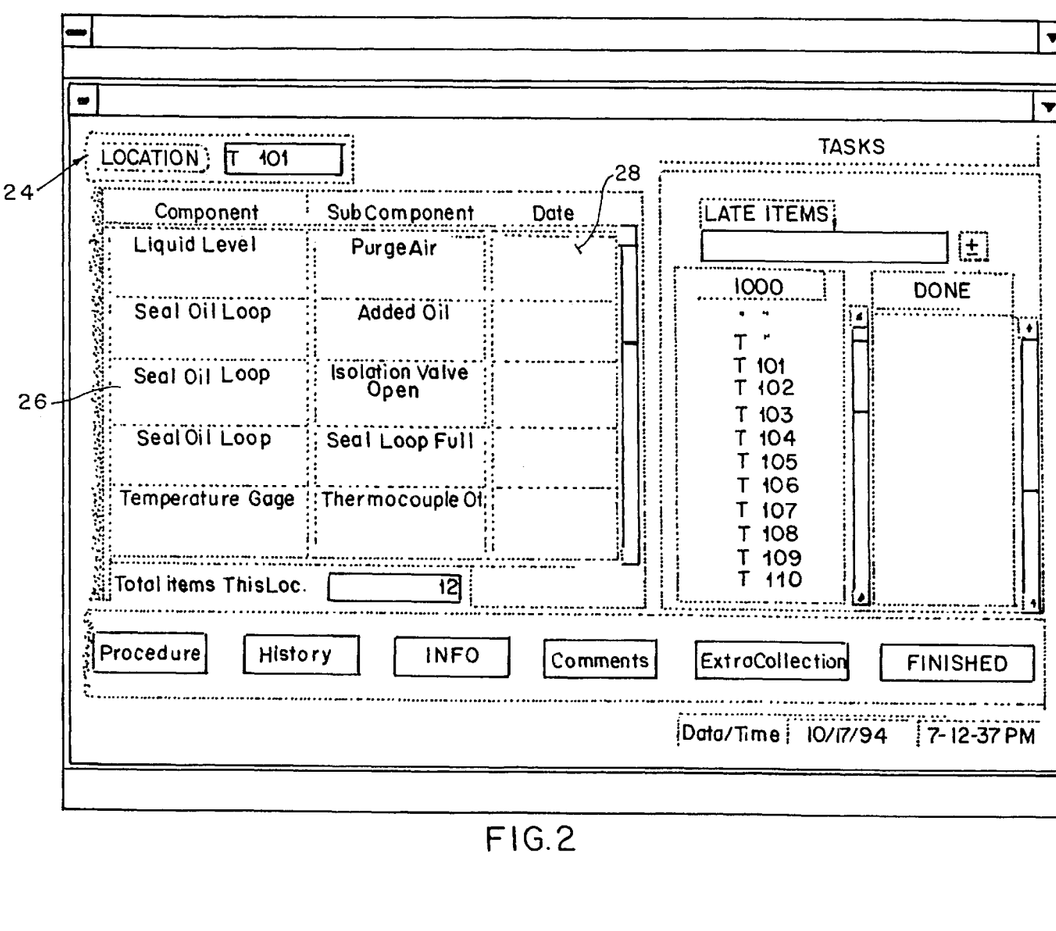
FIG. 2 is a representative To Do list screen in the hand held controller for the process.

FIG. 2 illustrates the initial screen of the hand held computer that gives the operator a To Do list of items of information to be collected and entered into the computer. A location box 24 on the upper left part of the screen lists which location in the field is currently selected. Beneath this box is a table 26 which displays the components at that selected location. Each component has additional fields containing sub-component descriptions and a box such as 28 for data to be entered or contain data already entered.

Figure 3:
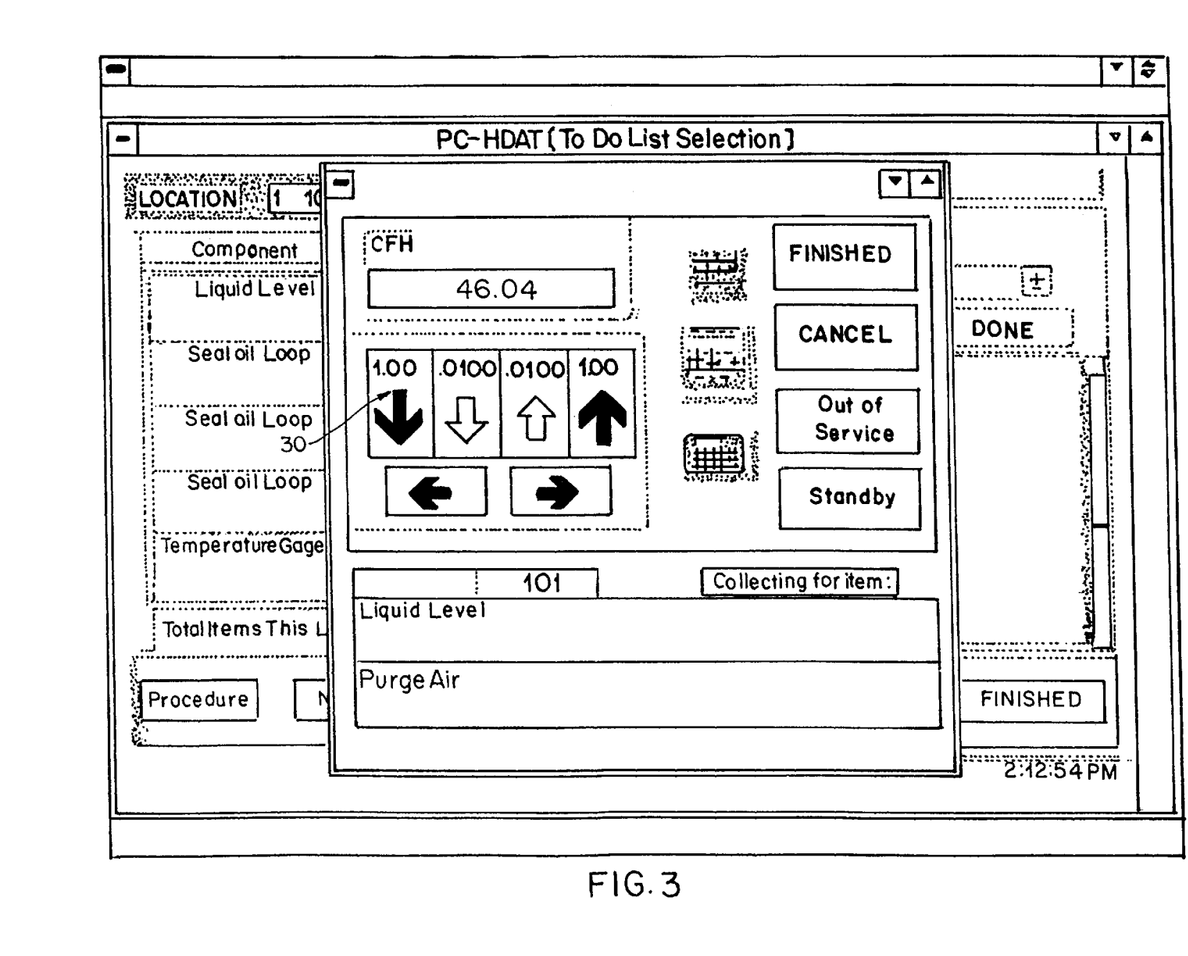
FIGS. 3, 4 and 5 illustrate screens that allow the operator to change or input data.
Figure 4:
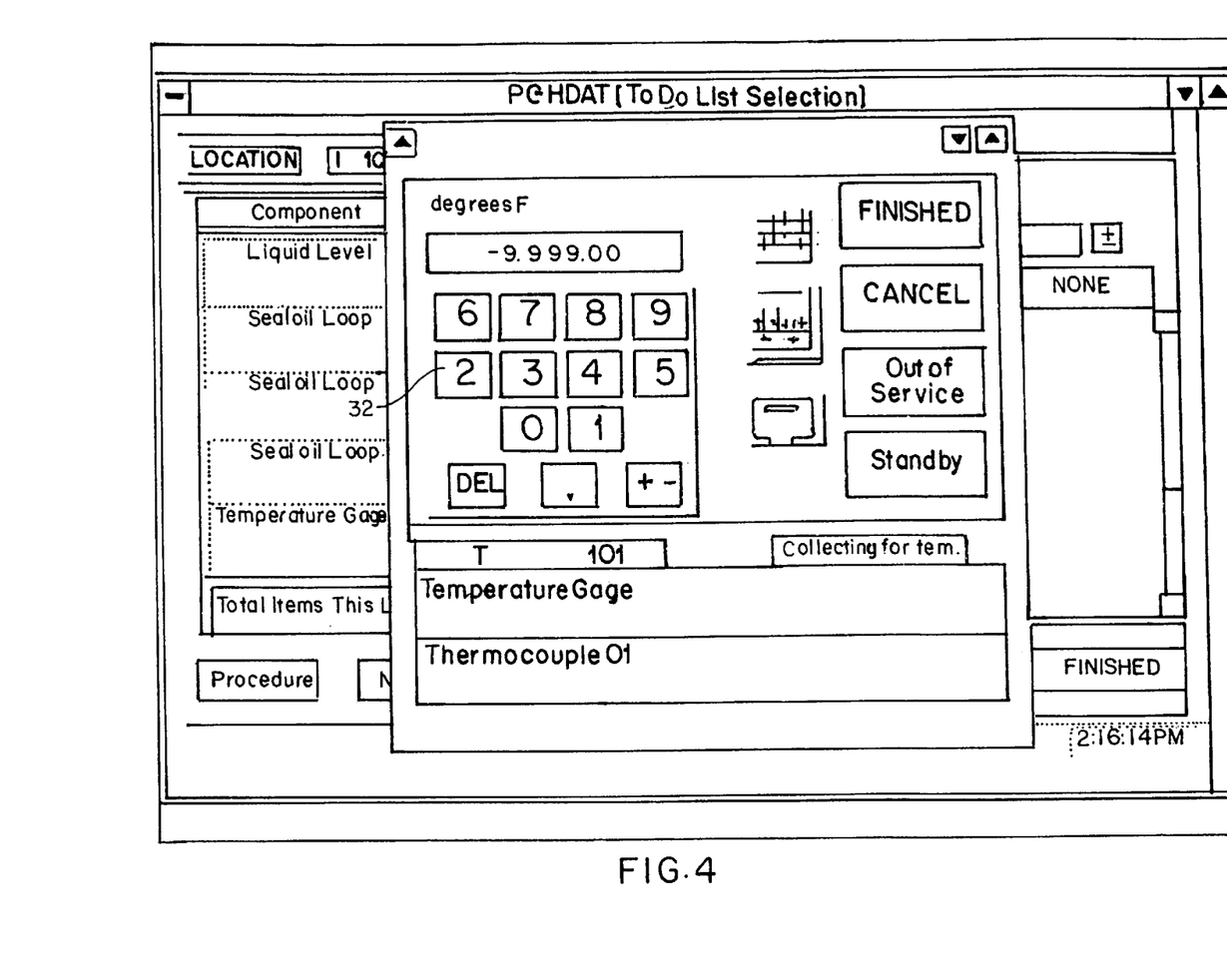
Figure 5:
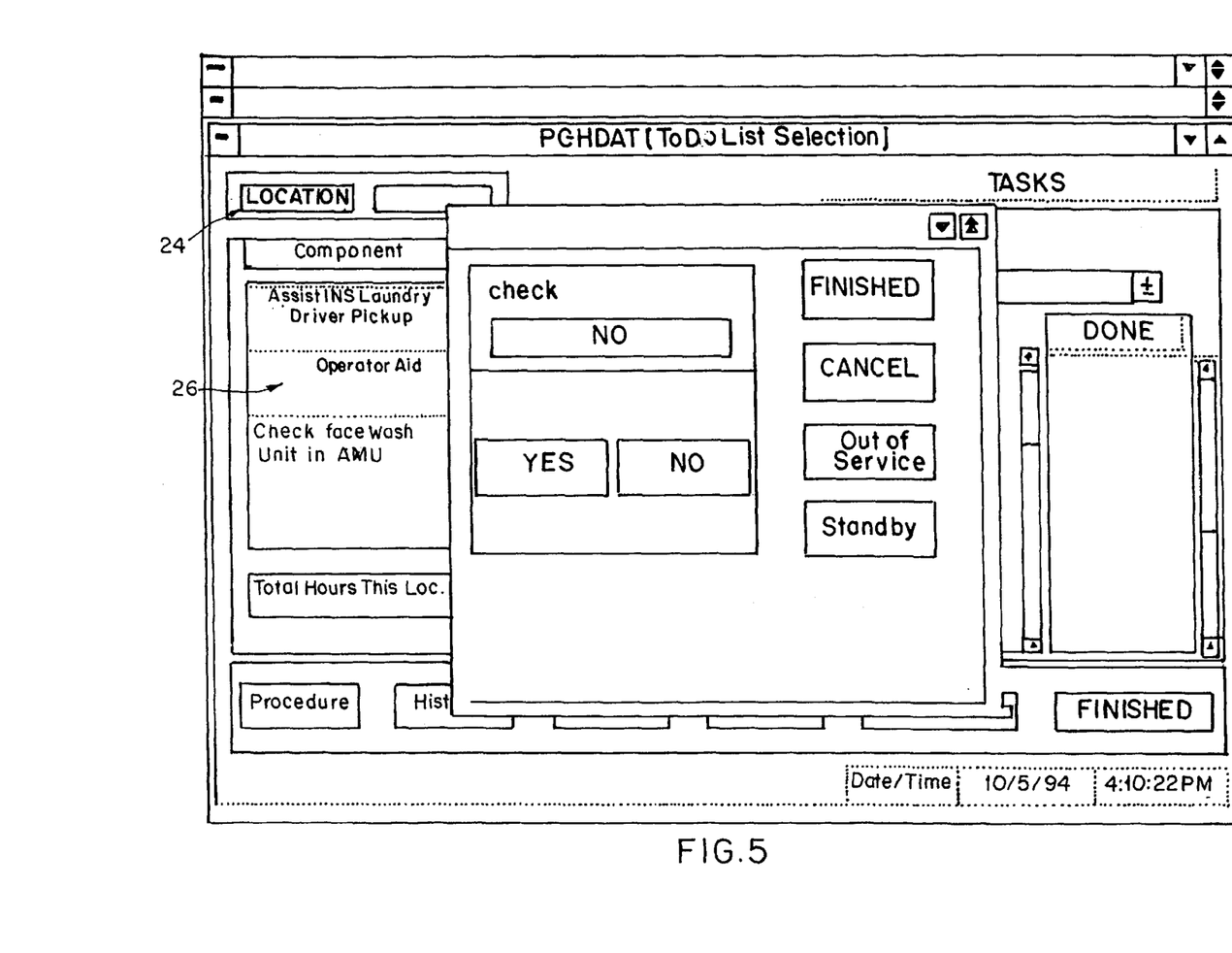

FIGS. 3, 4 and 5 illustrate screens that allow the operator to change or input data in the hand held computer. In FIG. 3 data values are entered using the arrow keys 30 to increment or decrement the displayed value. If the component is out of service the out of service button can be selected. If the component is not available the standby button is selected. After the information is selected a new To Do list screen is displayed for the next location. FIG. 4 illustrates a screen that functions similar to FIG. 3 except that a numeric pad is provided for enter the data for the particular component. FIG. 4 allows the operator to input data values with a numeric key pad 32. FIG. 5 allows the operation to input information when only a yes or no response is required.

Figure 6:
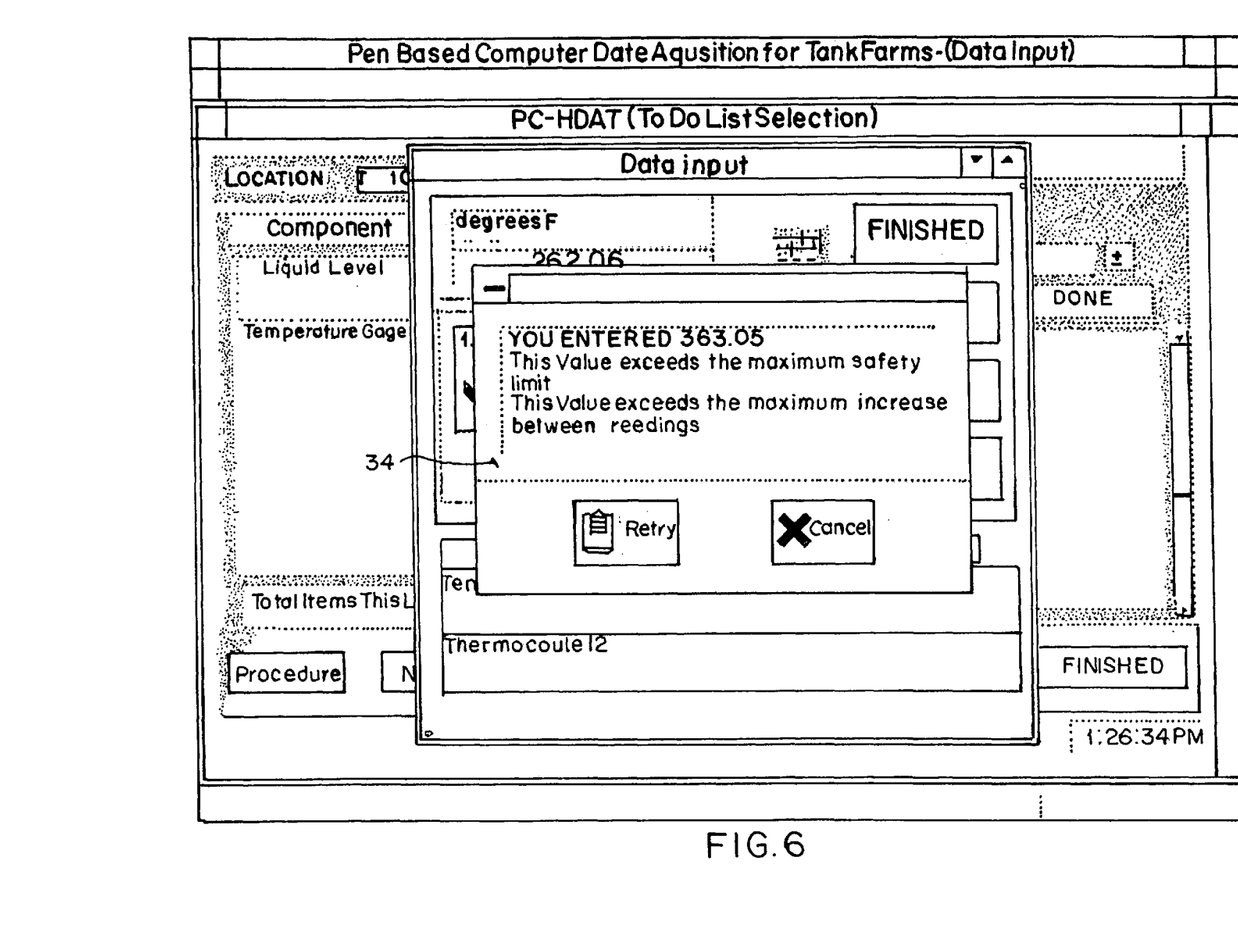
FIGS. 6 and 7 illustrate screens that prompts the operator to check or verify inputted data when the information is exceeds preprogrammed range limits or safety limits.
Figure 7:
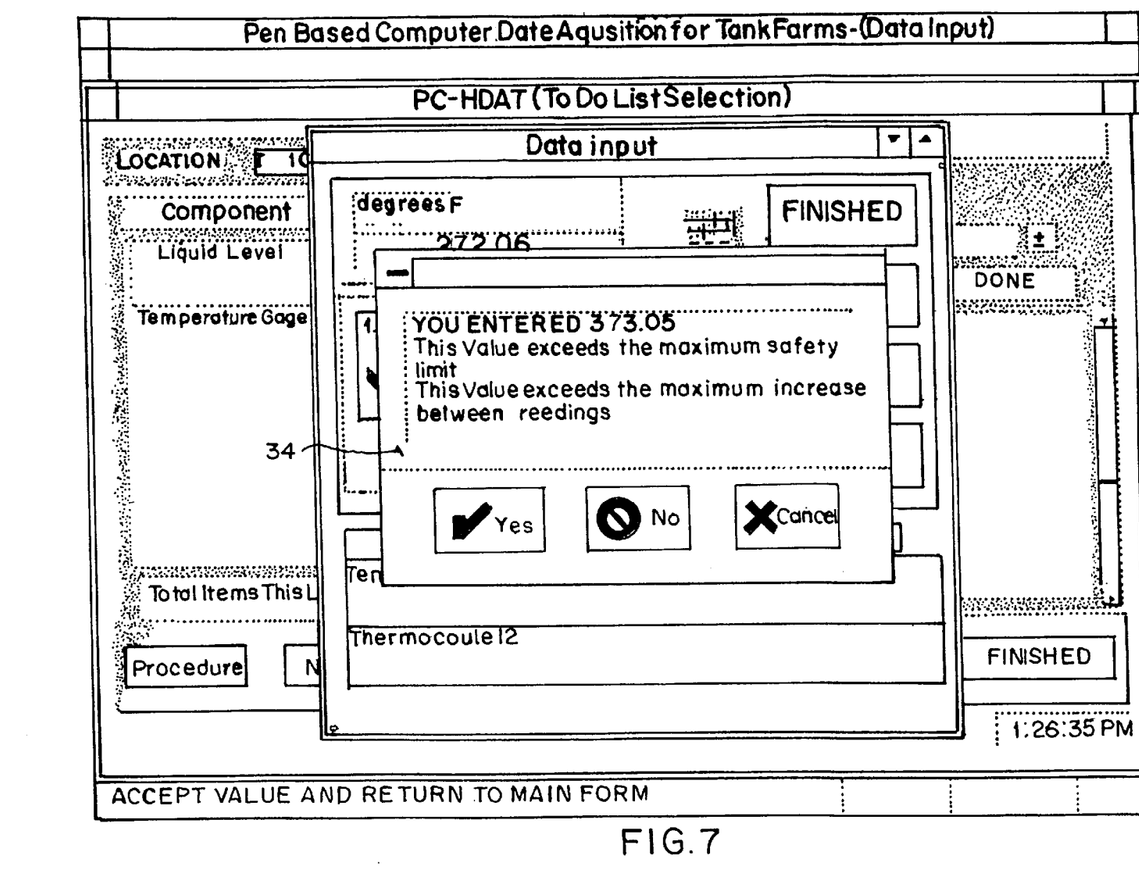

FIGS. 6 and 7 prompts the operator to check or verify inputted data when the information is exceeds preprogrammed range limits or safety limits. If the entered data exceeds the applicable date limits and range conditions a range violation screen 34 is displayed to prompt the operator to recheck the data. If the data inputted is still out of range, an Accept Violation Range Screen appears 36 which prompts the operator to verify the information inputted.

Figure 8:
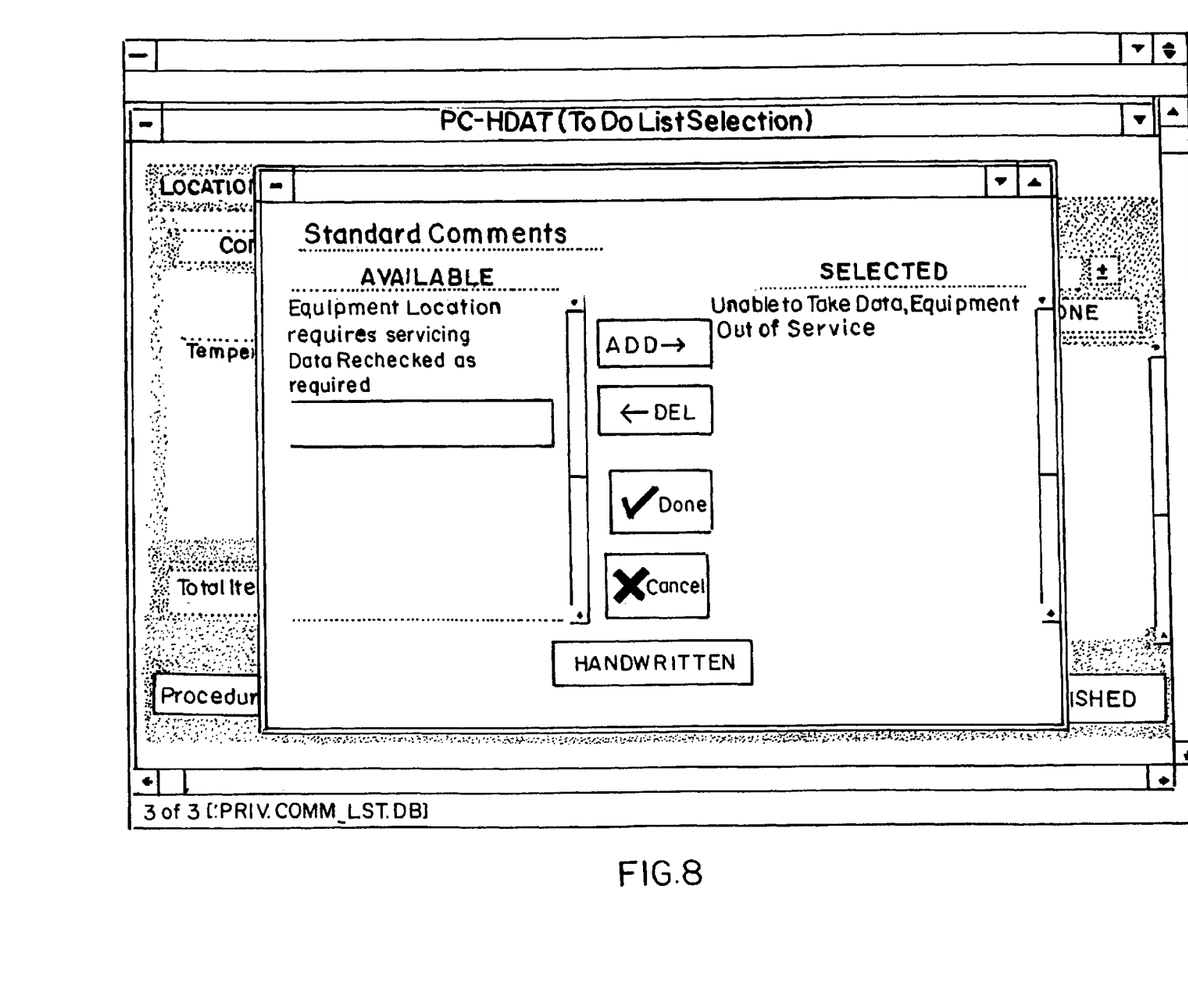
FIGS. 8 and 9 illustrate comment screens that allows the operator to make comments with an electronic pen.
Figure 9:
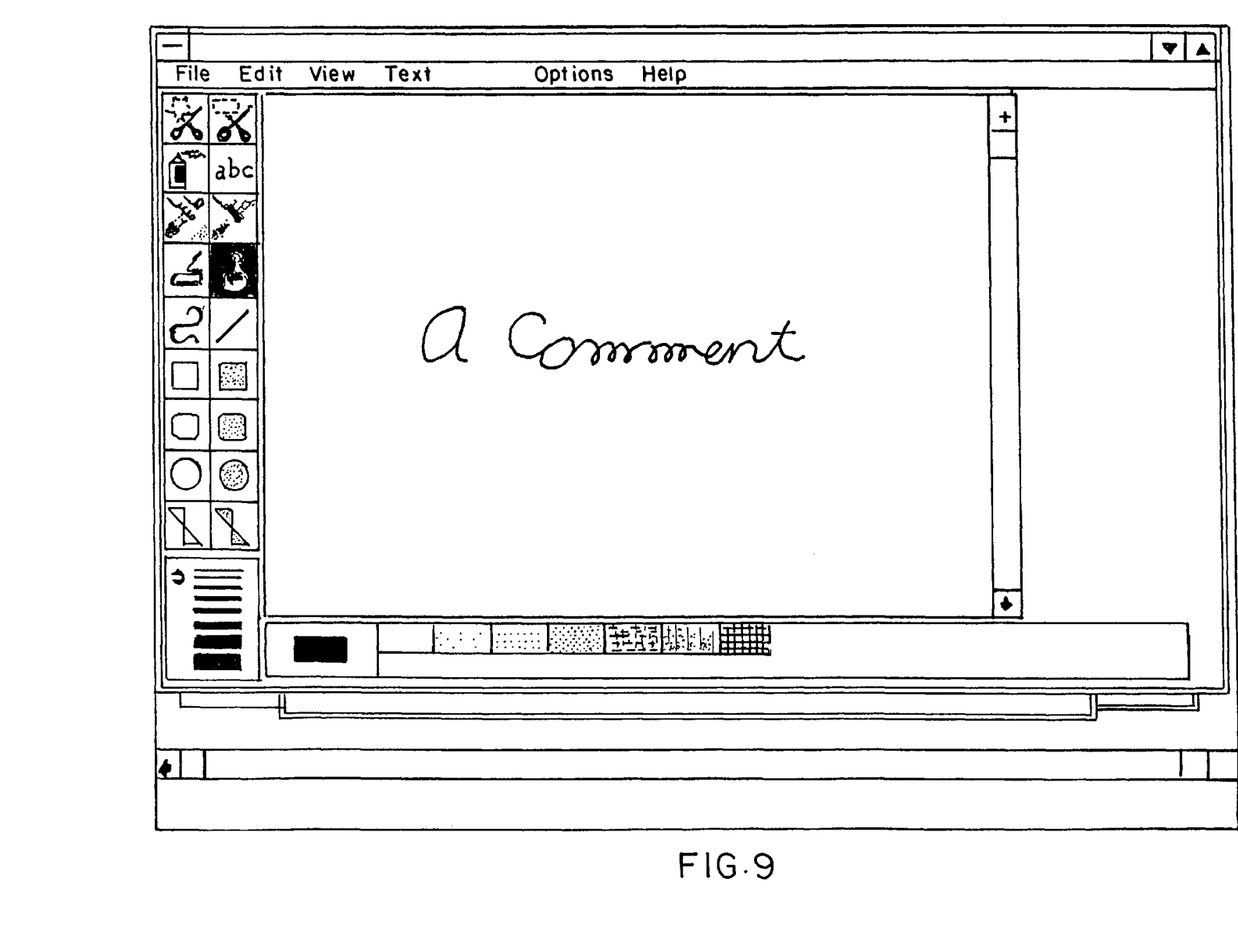

FIGS. 8 and 9 are comment screens that can be brought up when the operator selects the comment button on the To Do list screen and allows the operator to either input comments on the standard comments screen shown in FIG. 8 or select handwritten comments and enter his own comments on the screen shown in FIG. 9.

Thus utilizing the hand held computer, the system allows an operator to implement a method of servicing, maintaining, and monitoring a process such as a nuclear facility and have readily at his access all the process parameters and components to be checked as well as process procedures and specifications. This system supports the data collection activities. When called it will display the To Do screen for a selected location. Once a location is selected, the To Do screen prompts the operator to perform all the necessary monitoring procedures according to a preprogrammed process. The operator enters values for evaluation later or makes notes in the computer that prompts further maintenance upon review by management.

Figure 10:
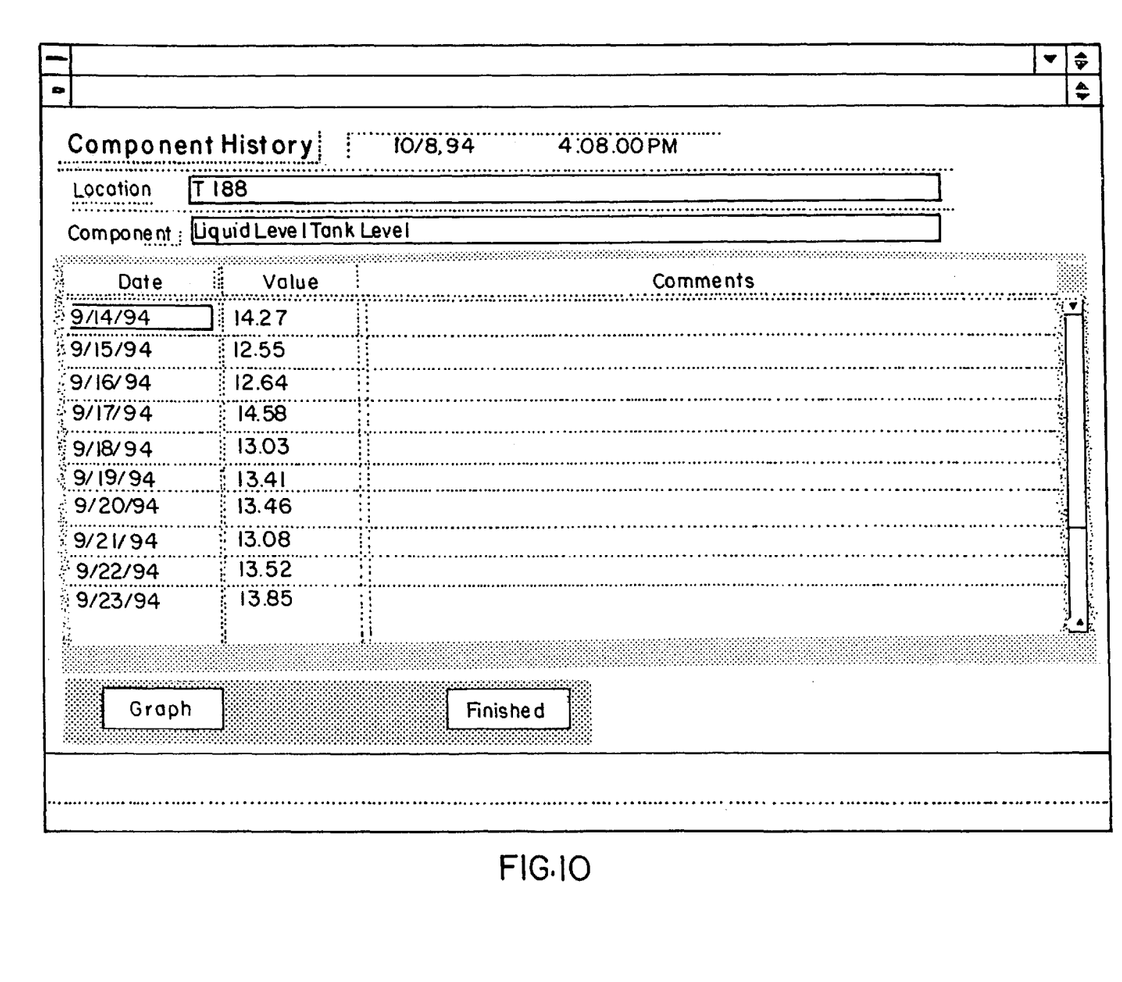
FIGS. 10, 11, and 12 illustrate screens that are representative graphic displays for particular environmental parameters in collecting and monitoring information for a nuclear facility.
Figure 11:
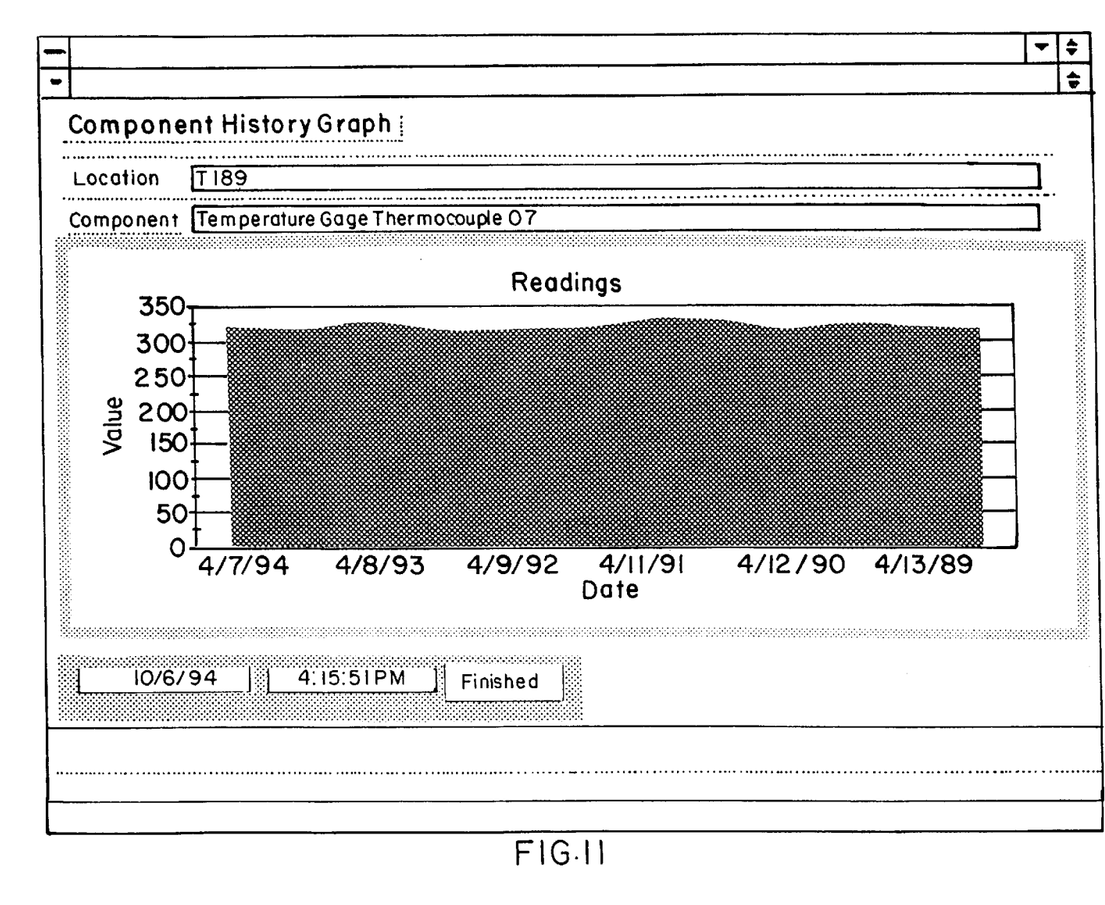
Figure 12:
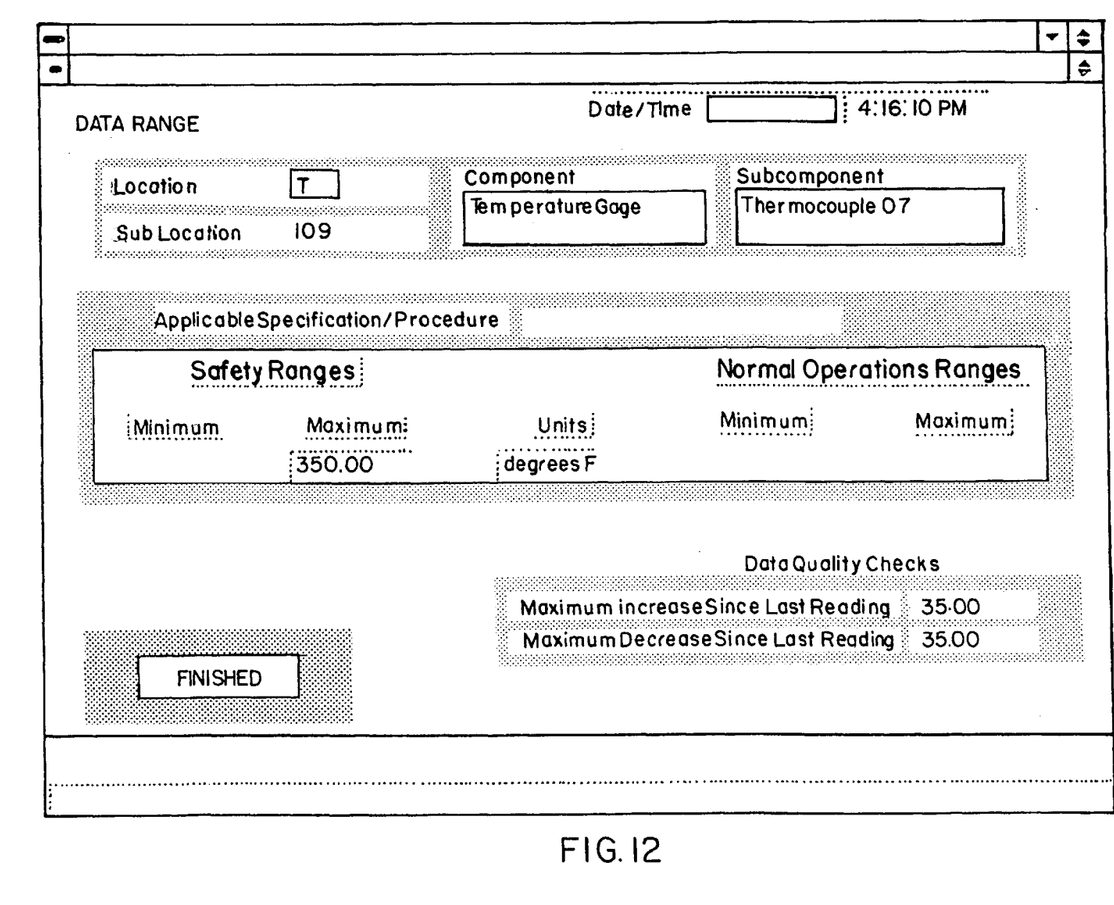

FIGS. 10, 11, and 12 are representative graphic displays for particular environmental parameters in collecting and monitoring information for a nuclear facility. If the operator selects the History button on the To Do screen the computer allows the operator to review the historical data for a component or sub-component either in tabular form as shown in FIG. 10 or graphical form as shown in FIG. 11. Selection of the Info button on the To Do screen allows the operator to review detailed data validation information including quality checks, safety range and operational ranges on the selected component or sub-component as shown in FIG. 12.

Figure 13:
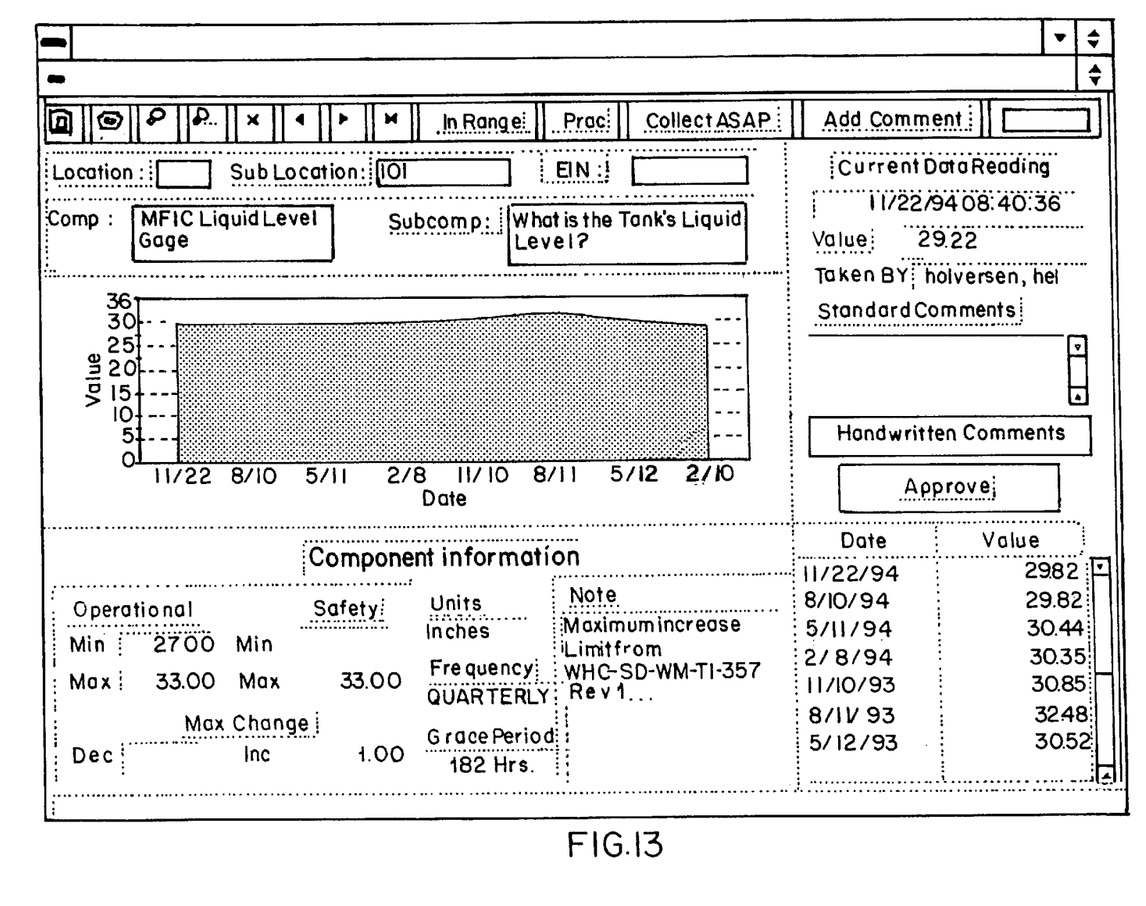
FIGS. 13, 14, and 15 illustrate screens for management of the overall system.
Figure 14:
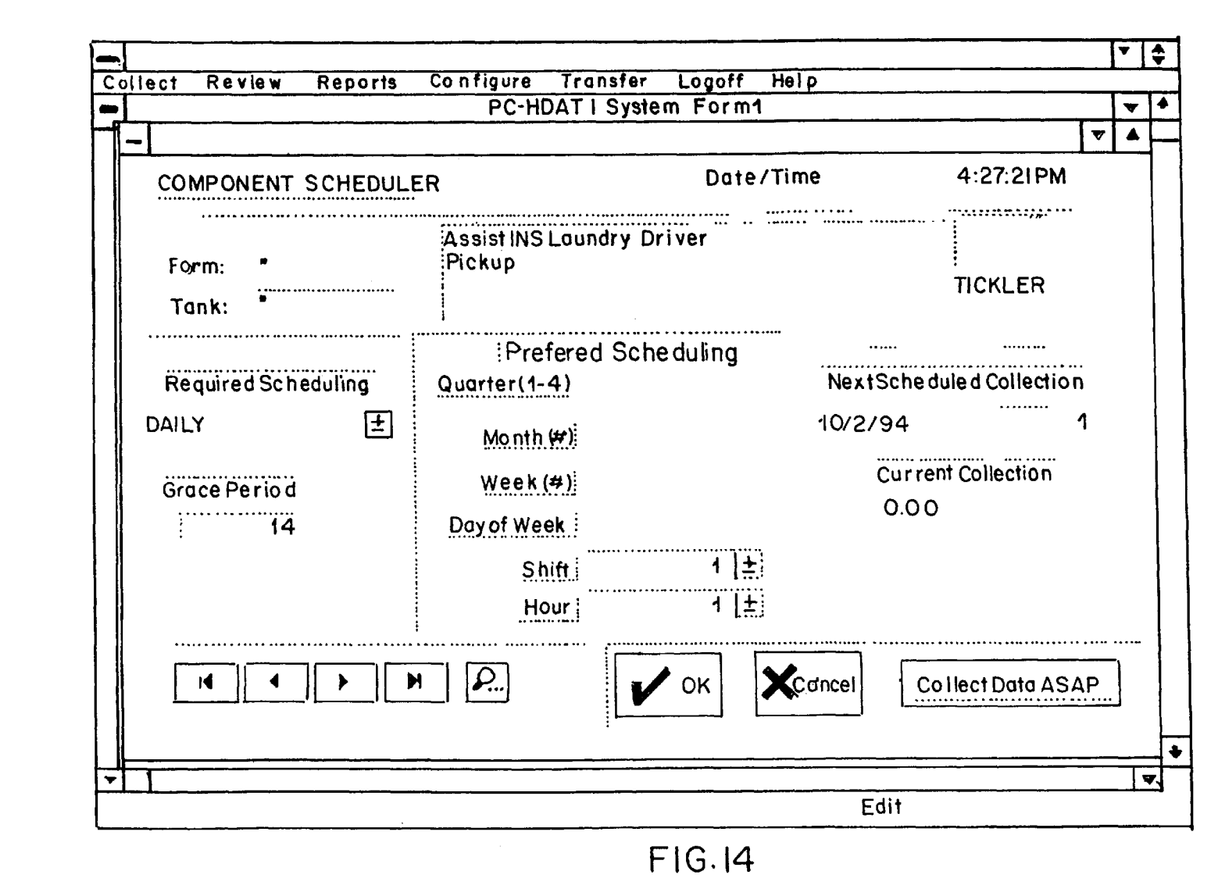
Figure 15:
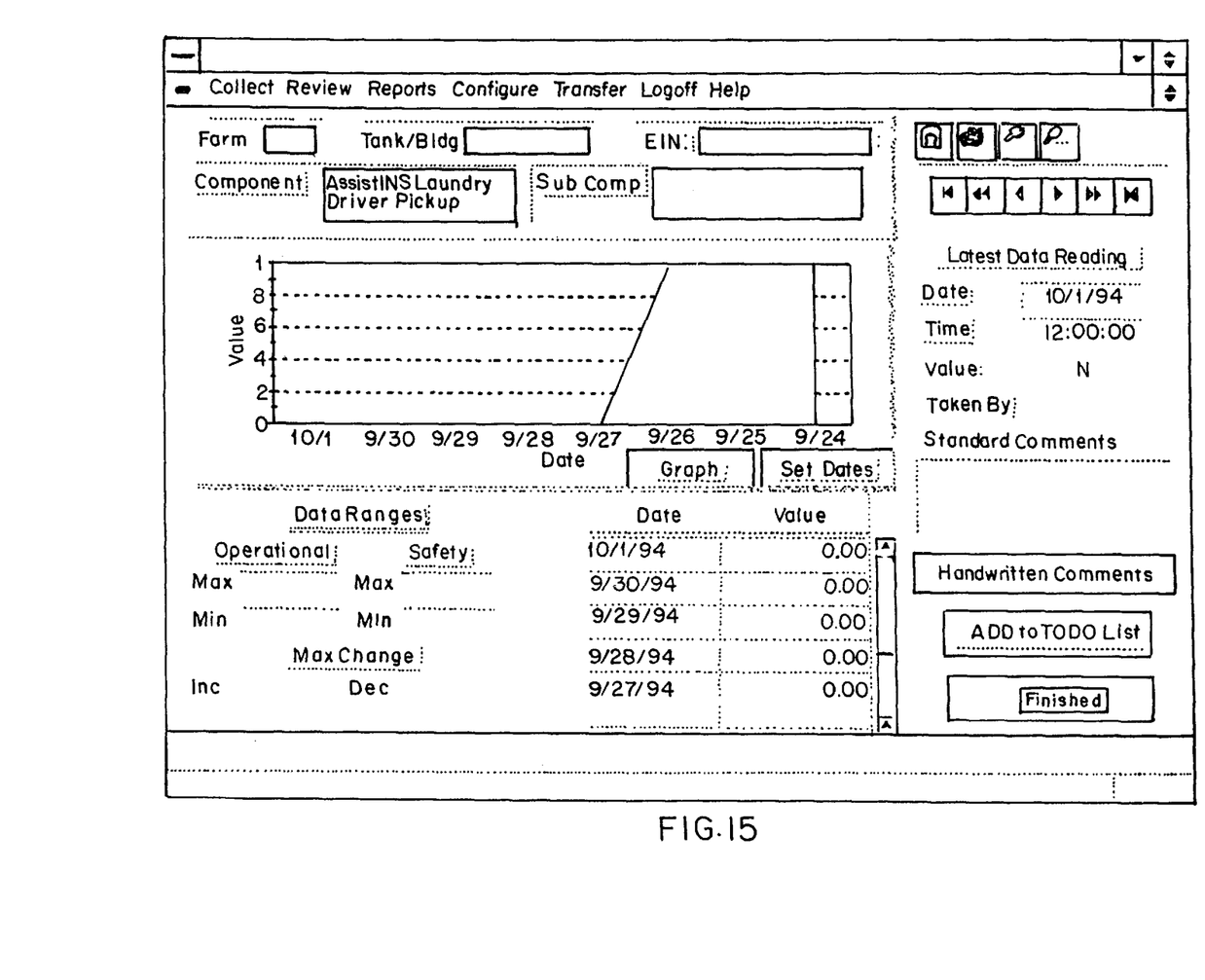

FIGS. 13, 14, and 15 are management screens that can be brought in the main computer system that allows scheduled maintenance, scheduling, review and analyze in-range and out-of-range data, verify and validate data, print data sheets, reports and graphics as desired, and transfer data across the network. Once the operator completes his system checks he downloads the information into the main computer or personal computer 20 via the interface means 18. FIG. 13 illustrates a screen that allows the management to review the data collected by the operator on a particular component for review or scheduling maintenance. FIG. 14 allows the operator or management to establish required and preferred data collection monitoring schedules for a specific component. This screen also allows the user to schedule immediate collection of data for the displayed component. FIG. 15 allows the user to review data that has already been validated at a specific location. This screen displays the latest recorded and validated data pertaining to a specific data item. To view other data items, the operator uses the VCR buttons 30 in the top right corner of the screen. As these buttons are selected all the information on the first, last, previous, or next data record that is contained in the system for each location and component.

Although there has been illustrated and described specific detail and structure of operation, it is clearly understood that the same were merely for purposes of illustration and that changes and modifications may be readily made therein by those skilled in the art without departing from the spirit and the scope of this invention.

What is claimed is:

1. A data collection and monitoring system for a facility, comprising:
   a. a hand held computer means for collecting data from inspection sites in a facility and storing data therein;
   b. instruction means within the hand held computer means for guiding the user of the data collection and monitoring system through various inspection sites and procedural steps;
   c. display means within the hand held computer for displaying text and graphics to the user of the hand held computer means;
   d. input means connected to the hand held computer means to allow the user to interact with the graphics displayed in real time wherein the user may edit the information shown on the display means;
   e. interface means connected to the hand held computer means for downloading data; and
   f. a main computer system connected to the interface means for receiving the downloaded data for further processing and uploading new collection monitoring and information to the hand held computer.

2. A data collection and monitoring system as recited in claim 1 wherein the hand held computer means is a pen based computer.

3. A data collection and monitoring system as recited in claim 2 wherein the instruction means is implemented in windows based software programs.

4. A data collection and monitoring system as recited in claim 3 wherein the input means is comprised of a keyboard and electronic pen for editing the information in the display means.

5. A data collection and monitoring system as recited in claim 4 wherein the interface means is a device that provides for power charging of the hand held computer and data transfer to and from the hand held computer.

6. A data collection and monitoring system as recited in claim 5 wherein the main computer is a personal computer.

7. A method for data collection and monitoring inspection sites in a facility, comprising the steps of:
   a. storing location, procedural maintenance steps, component parameters, and data values in a hand held computer;
   b. displaying instruction windows and graphics to the data collector for each location;
   c. providing real time interaction means for the data collector to edit the information displayed or input new information into the hand held computer.
   d. downloading information from the hand held computer to a main computer means; and
   e. uploading updated information from the main computer means to the hand held computer for data collection and maintenance.

* * * * *